United States Patent [19]

Lambelet

[11] Patent Number: 4,708,755

[45] Date of Patent: Nov. 24, 1987

[54] METHOD OF FACILITATING THE COVERING OF LARGE SURFACES

[76] Inventor: José A. Lambelet, 523 Harvard Rd., San Mateo, Calif. 94402

[21] Appl. No.: 458,253

[22] Filed: Jan. 17, 1983

[51] Int. Cl.$^4$ .............................................. E04B 2/00
[52] U.S. Cl. .................................. 156/64; 33/137 R; 52/105; 52/746; 156/71; 156/258; 156/263; 156/300; 156/304.1
[58] Field of Search ................ 156/64, 300, 71, 304.1, 156/258, 263; 52/105, 746; 33/137 R

[56] References Cited

U.S. PATENT DOCUMENTS

| | | | |
|---|---|---|---|
| 2,187,087 | 1/1940 | Leary | 52/105 |
| 2,925,631 | 2/1960 | Larson et al. | 52/746 |
| 4,217,379 | 8/1980 | Salvador | 33/137 R |

Primary Examiner—John J. Gallagher
Attorney, Agent, or Firm—Karl F. Ross; Herbert Dubno

[57] ABSTRACT

A large surface to be lined with a covering cut precisely to size, e.g. a wall of a room or building to be paneled or papered, is marked with strips of adhesive measuring tape posted thereon along orthogonally intersecting lines to divide its area into zones whose dimensions can be accurately read thereon. The strips may be left in position when the covering is applied and, advantageously, have centerlines determining the boundaries of adjoining zones, the covering being divided into sections abutting one another along these boundaries.

1 Claim, 4 Drawing Figures

METHOD OF FACILITATING THE COVERING OF LARGE SURFACES

FIELD OF THE INVENTION

My present invention relates to a method of simplifying the task of coextensively placing paper, paneling, tiles, carpeting or other coverings on large surfaces, such as areas of building walls. The term "walls", as broadly used here, includes not only upright structures but also floors and ceilings.

BACKGROUND OF THE INVENTION

The covering materials here considered generally come in sections which must be pieced together in abutting relationship when being nailed, pasted or otherwise applied to the surface to be lined thereby. At least some of these sections, such as those coming to adjoin the edges of that surface, must be precisely cut to size in order to conform to the area that is to be covered. In many instances, especially with rigid workpieces such as veneers, glass panes, plastic sheets or metal plates, the sizing must be done in advance on the basis of measurements taken at the site. The handling of measuring tapes used for this purpose often requires the assistance of a second person; if a tape is too short to extend over the length or height of a wall, it must be shifted along the surface after a reference point has been marked thereon. These procedures are awkward and tend to give rise to errors which must be corrected by a trimming of workpieces cut too large or a replacement of others that turned out undersized.

OBJECT OF THE INVENTION

The object of my present invention, therefore, is to provide a method of obviating these drawbacks in the covering of a building wall or some other large surface and facilitating the fitting of sections of covering material to correspondingly dimensioned zones of such a surface even when at least some of these zones have boundaries not determined in advance.

SUMMARY OF THE INVENTION

In accordance with my present invention, strips of adhesive tape are pasted along orthogonally intersecting lines onto the surface to be covered, the strips being provided with numerical markings on their exposed sides. These markings enable a reading of the dimensions of the zones, generally rectangular, into which that surface has been divided by the intersecting strips whereupon sections of covering material commensurate with the read dimensions are applied to the respective zones. To the extent that the boundaries of these zones were previously undetermined, the sections to be fitted thereto are cut to size in accordance with these readings.

Advantageously, the strips are left in position during application of the covering sections or workpieces to the surface so as to serve as edge guides for the latter. To this end I may provide the strips with longitudinal centerlines representing the zonal boundaries along which adjoining sections can be positioned in abutting relationship.

Measuring tapes of the kind here envisaged, provided with an adhesive backing, are known per se for different purposes such as indicating the contents of a bottle or serving as a sewing guide; see U.S. Pat. Nos. 2,507,684 and 3,797,120. Their utilization in the present context, however, has not been suggested in any prior-art publication of which I am aware.

BRIEF DESCRIPTION OF THE DRAWING

The above and other features of my invention will now be described in detail with reference to the accompanying drawing in which.

SPECIFIC DESCRIPTION

Figure 1:
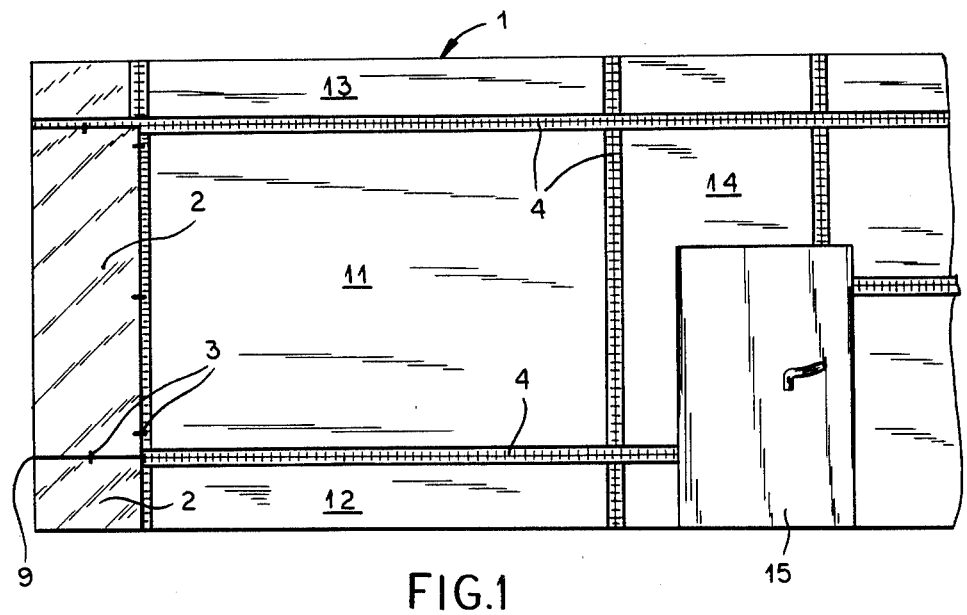
FIG. 1 is an elevational view of an internal or external building wall in the process of being lined with workpieces by the method according to my invention.

FIG. 1 shows a building wall 1 whose surface, interrupted by a door 15, is to be covered by workpieces 2 such as, for example, panes of reflecting glass. Let it be assumed that the available panes include a large rectangular mirror which the user wishes to place midway between the floor and the ceiling slightly to the left of the door 15. Strips of adhesive tape 4 are pasted, for this purpose, horizontally and vertically on the surface of wall 1 to divide its area into several rectangular zones some of which have been designated 11, 12, 13 and 14. The measuring tape 4, shown on a larger scale in FIGS. 2–4, carries an adhesive backing 5 and is provided on its exposed front face with numerical markings 6—e.g. in centimeters or inches—at opposite sides of a longitudinal centerline 7. These markings enable the positioning of two horizontal and two vertical strips, framing the zone 11, with their centerlines separated by distances exactly corresponding to the known length and height of the rectangular mirror which is to cover that zone. Conversely, the tape markings also permit the user to read the size to which other panes must be cut in order to fit the narrow zones 12 and 13, left over below and above that mirror, as well as the L-shaped zone 14 adjacent the door 15 and others not specifically designated in FIG. 1. Two of these latter zones are shown already covered by correspondingly tailored panes 2 which are held in position by fasteners such as clips 3. In their mounted positions, the panes abut one another along zonal boundaries 9 which coincide with the centerlines 7 of the underlying strips of tape 4. The larger pane 2, for example, terminates at the centerline of the vertical strip bounding the zone 11 on the left.

Figures 2, 3, 4:
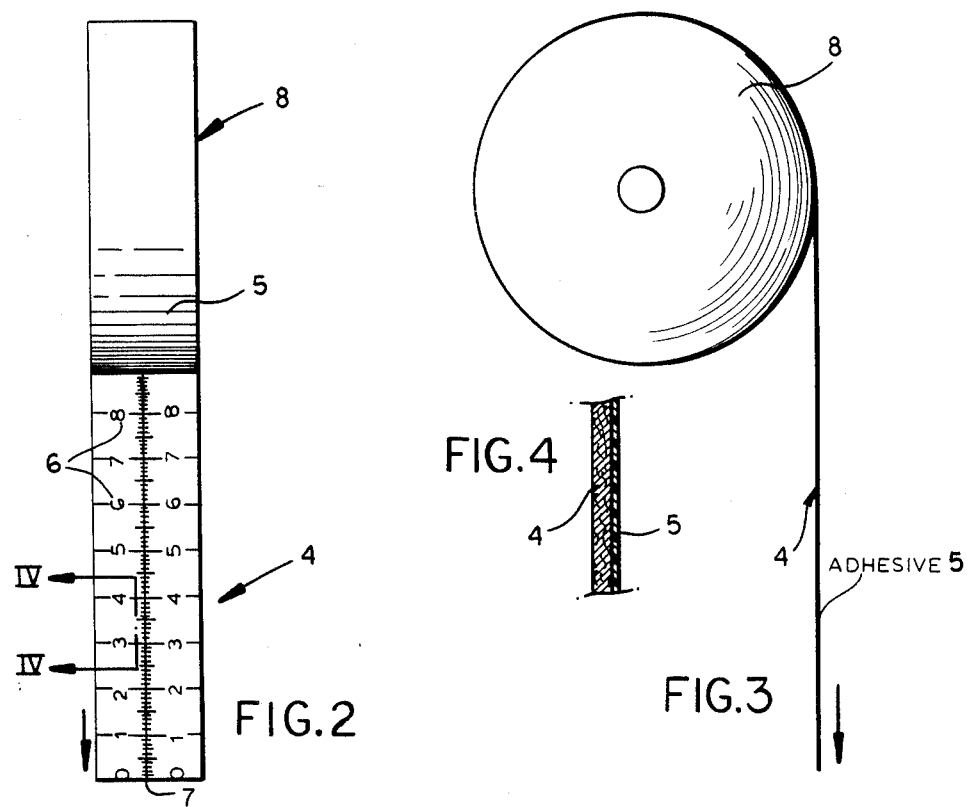
FIG. 2 is a face view of part of a measuring tape, drawn from a reel, used in covering the building wall of FIG. 1.
FIG. 3 is a side-elevational view of the reel and tape shown in FIG. 2.
FIG. 4 is a fragmentary, enlarged sectional view of the tape taken on the line IV—IV of FIG. 2.

The measuring tape 4 is drawn from a reel 8, FIGS. 2 and 3, making it easy to fasten the free end of the tape next to a horizontal or vertical edge of wall 1 and to move with the tape from there to the opposite edge. Even if it should be necessary to join several pieces of tape together to form a throughgoing strip, their combined length will be readily ascertainable from the numerical markings 6 appearing thereon.

A particular advantage of the array of the strips of tape 4 left in place underneath the covering sections or workpieces 2 is the fact that, if a damaged section has to be replaced, its dimensions are again immediately ascertainable from the tape portions exposed upon its removal. Thus, shattered glass panes, torn pieces of wallpaper or warped segments of a rug or carpet can be duplicated without necessitating any remeasuring of the zones previously occupied thereby.

The adhesive backing 5 could be of the pressure-sensitive type. The tape 4 can be made of paper, fabric, plastic foil or the like.

I claim:

1. A method of lining a large surface with a precisely coextensive covering therefor, comprising the steps of:

(a) pasting strips of adhesive measuring tape along orthogonally intersecting lines onto said surface to divide the area thereof into zones at least some of whose boundaries are undetermined in advance, said strips being provided on their exposed faces with longitudinal centerlines representing the boundaries of adjoining zones, each strip further carrying two sets of numerical markings on opposite sides of its centerline;

(b) reading the dimensions of said zones on said markings;

(c) cutting sections of said covering to sizes commensurate with the read dimensions of zones with previously undetermined boundaries; and (d) applying said sections to corresponding zones, the covering of a zone terminating at the centerline of a strip while leaving free the set of markings on the side of a zone still to be covered.

* * * * *